(12) United States Patent
Liggett et al.

(10) Patent No.: US 8,158,236 B2
(45) Date of Patent: *Apr. 17, 2012

(54) CONDUCTIVE SEAM COVER TAPE

(75) Inventors: Paul E. Liggett, Wooster, OH (US); Steven L. Sinsabaugh, Uniontown, OH (US); James I. Mascolino, North Canton, OH (US)

(73) Assignee: Lockheed Martin Corporation, Bethesda, MD (US)

( * ) Notice: Subject to any disclaimer, the term of this patent is extended or adjusted under 35 U.S.C. 154(b) by 868 days.

This patent is subject to a terminal disclaimer.

(21) Appl. No.: 12/039,992

(22) Filed: Feb. 29, 2008

(65) Prior Publication Data
US 2009/0220726 A1    Sep. 3, 2009

(51) Int. Cl.
*B32B 3/10* (2006.01)
*B32B 27/00* (2006.01)
*B32B 27/06* (2006.01)

(52) U.S. Cl. .......... 428/77; 244/24; 244/29; 428/98; 428/141

(58) Field of Classification Search .......... 428/77, 428/141, 195, 98; 244/24, 29
See application file for complete search history.

(56) References Cited

U.S. PATENT DOCUMENTS

| | | |
|---|---|---|
| H1104 H | 9/1992 | Cavanagh |
| 5,885,911 A | 3/1999 | Ashcraft et al. |
| 6,074,722 A | 6/2000 | Cuccias |
| 6,110,565 A * | 8/2000 | Matthews .......... 428/156 |
| 6,224,016 B1 | 5/2001 | Lee et al. |
| 6,979,479 B2 | 12/2005 | Lavan et al. |
| 7,150,938 B2 | 12/2006 | Munshi et al. |
| 2006/0192054 A1* | 8/2006 | Lachenmeier .......... 244/145 |
| 2007/0238381 A1* | 10/2007 | Brewer et al. .......... 442/149 |
| 2007/0281570 A1* | 12/2007 | Liggett et al. .......... 442/378 |

FOREIGN PATENT DOCUMENTS

| | | |
|---|---|---|
| DE | 69515 A1 | 7/1969 |
| DE | 102007006048 A1 | 8/2008 |
| DE | 102007043771 A1 | 6/2009 |
| GB | 1396426 A | 7/1972 |

OTHER PUBLICATIONS

Cavanagh, Richard A. "Air Cushion Vehicle Conductive/Semiconductive Felxible Skirt, and Method" United States Statutory Invention Registration Registration No. H1104; Published Sep. 1, 1992.

* cited by examiner

*Primary Examiner* — Brent Ohern
(74) *Attorney, Agent, or Firm* — James C. Scott; Roetzel & Andress

(57) ABSTRACT

The present invention is generally directed to tapes designed for use in conjunction with lighter-than-air vehicles, platforms or other inflated structures. In one embodiment, the present invention is directed to conductive seam cover tape that can be, for example, used to protect and/or cover one or more seams in a lighter-than-air vehicle, platform or other inflated structure. In another embodiment, the present invention is directed to a conductive seam cover tape that can be, for example, used to protect and/or cover fabric panels or sections that are used to form lighter-than-air vehicles, platforms or other inflated structures that are in, one instance, designed for deployment at high altitudes.

19 Claims, 3 Drawing Sheets

CONDUCTIVE SEAM COVER TAPE

FIELD OF THE INVENTION

The present invention is generally directed to tapes designed for use in conjunction with lighter-than-air vehicles, platforms or other inflated structures. In one embodiment, the present invention is directed to conductive seam cover tape that can be, for example, used to protect and/or cover gaps and exposed edges of one or more seams in a lighter-than-air vehicle, platform or other inflated structure. In another embodiment, the present invention is directed to a conductive seam cover tape that can be, for example, used to make local repairs to the protective coatings on fabric panels or sections that are used to form lighter-than-air vehicles, platforms or other inflated structures that are in, one instance, designed for deployment at high altitudes.

BACKGROUND OF THE INVENTION

Lighter-than-air vehicles, such as aerostats, blimps, balloon, dirigibles, or airships, are used in many different applications, such as near large sporting, entertainment or cultural events, or in large metropolitan areas to provide advertising or to provide high level coverage of the events. Lighter-than-air vehicles are also used in high altitude applications, for the purpose of weather monitoring and/or military surveillance. In such instances, the higher a vehicle can operate translates into an increased amount of area that can be viewed for surveillance purposes and/or weather monitoring. Additionally, lighter-than-air vehicles that possess the ability to operate at altitudes above 50,000 feet, are not a hazard to commercial air traffic, are more difficult to detect and/or destroy, can be used for the surveillance of wide areas and thus provide a strategic and/or economic advantage.

Typically, high altitude lighter-than-air vehicles are made from laminates of materials that withstand a wide range of temperature variation, ozone degradation, exposure to ultra-violet radiation and daily expansion and contraction due to the wide temperature variations.

For example, U.S. Pat. No. 6,074,722 to Cuccias teaches a fabric laminate made of a layer of polyurethane resin that is used to bond layers of high strength liquid crystal thermotropic (melt spun) polyester (VECTRAN®), aromatic polyaramide (KEVLAR®), or polyester (DACRON®) fiber woven yarn to a polyvinyl fluoride (TEDLAR® or MYLAR®) layer, and having an outer layer of a material that is resistant to degradation by ultra violet radiation. This combination provides a laminate that is substantially imperious to helium or hydrogen gas and provides protection from degradation, wind erosion and the like.

U.S. Pat. No. 6,979,479 teaches a laminate of a liquid crystal polymer fiber yarn layer (VECTRAN®) as an interior surface, an adhesive layer, a polyimide layer, and a polyvinylidene fluoride (PVDF) layer which forms the exterior surface. The polyimide layer functions as a gas barrier for retaining helium or hydrogen. The polyvinylidene fluoride layer provides ozone and ultraviolet radiation protection.

For fabrics for lighter-than-air vehicles operating at high altitudes, it is also typical to have a thin metallic coating as one of the layers to reflect most of the incident solar radiation, reduce helium permeation, minimize the effects of lightning strikes, and provide a means for uniform static electric distribution over the hull surface.

Further, when the fabric panels or sections (e.g., hull sections) are assembled to form a lighter-than-air vehicle, platform or other inflated structure, while there is an effort to have the surface be as continuous as possible, there are instances where the fabric panels or sections (e.g., hull sections) are assembled in pieces and are joined edge-to-edge using structural seam tape. The structural seam tape is generally located on the inside surface or the surface facing the helium-containing portion of the lighter-than-air vehicle, platform or other inflated structure. A seam cover tape is generally located on the outside surface of the lighter-than-air vehicle, platform or other inflated structure, and is designed to protect and/or cover any gaps and/or seams located between one or more fabric panels or sections (e.g., hull sections).

SUMMARY OF THE INVENTION

The present invention is generally directed to tapes designed for use in conjunction with lighter-than-air vehicles, platforms or other inflated structures. In one embodiment, the present invention is directed to conductive seam cover tape that can be, for example, used to protect and/or cover gaps and exposed edges of one or more seams in a lighter-than-air vehicle, platform or other inflated structure. In another embodiment, the present invention is directed to a conductive seam cover tape that can be, for example, used to make local repairs to the protective coatings on the fabric panels or sections that are used to form lighter-than-air vehicles, platforms or other inflated structures that are in, one instance, designed for deployment at high altitudes.

In one embodiment, the conductive seam cover tape of the present invention comprises a first layer formed from at least one conductive adhesive composition, where the first layer has an upper surface and a lower surface; a second layer formed from at least one polymer composition that possesses gas barrier properties, where the second layer has an upper surface and a lower surface and the lower surface of the second layer is oriented toward the upper surface of the first layer and the second layer is designed to be highly reflective of solar radiation; and a third layer being formed from one or more UV-resistant polymer compositions, where the third layer has an upper surface and a lower surface and the lower surface of the third layer is oriented toward the upper surface of the second layer.

In another embodiment, the seaming tape for sealing and/or reinforcing the seams in a hull of a lighter-than-air vehicle comprises a first layer formed from at least one conductive adhesive composition, where the first layer has an upper surface and a lower surface; a second layer formed from at least one polymer composition that possesses gas barrier properties, where the second layer has an upper surface and a lower surface and the lower surface of the second layer is oriented toward the upper surface of the first layer and the second layer is designed to be highly reflective of solar radiation; a third layer formed from one or more UV-resistant polymer compositions, where the third layer has an upper surface and a lower surface and the lower surface of the third layer is oriented toward the upper surface of the second layer; and a fourth layer, the fourth layer formed from one or more clear UV-resistant polymer compositions, where the fourth layer has an upper surface and a lower surface and the lower surface of the fourth layer is oriented toward the upper surface of the third layer, where the fourth layer extends beyond the first, second and third layers and is heat sealable or fuseable into the protective coating layer on the exterior of the fabric panels or sections used in the construction of lighter-than-air vehicles.

DETAILED DESCRIPTION OF THE INVENTION

The present invention is generally directed to tapes designed for use in conjunction with lighter-than-air vehicles, platforms or other inflated structures. In one embodiment, the present invention is directed to conductive seam cover tape that can be, for example, used to protect and/or cover gaps and exposed edges of one or more seams in a lighter-than-air vehicle, platform or other inflated structure. In another embodiment, the present invention is directed to a conductive seam cover tape that can be, for example, used to make local repairs to the protective coatings on fabric panels or sections that are used to form lighter-than-air vehicles, platforms or other inflated structures that are in, one instance, designed for deployment at high altitudes.

In the specification of the present invention, when the term lighter-than-air vehicle is utilized, such a term covers all types of lighter-than-air vehicles, platforms or other inflated structures.

The conductive seam cover tapes of the present invention can be used to repair and/or patch defects, damage and/or holes in the conductive coating and/or optical layer of a fabric panel or section (e.g., a hull section) irrespective of the location of any such defect, damage and/or hole.

Figure 1:
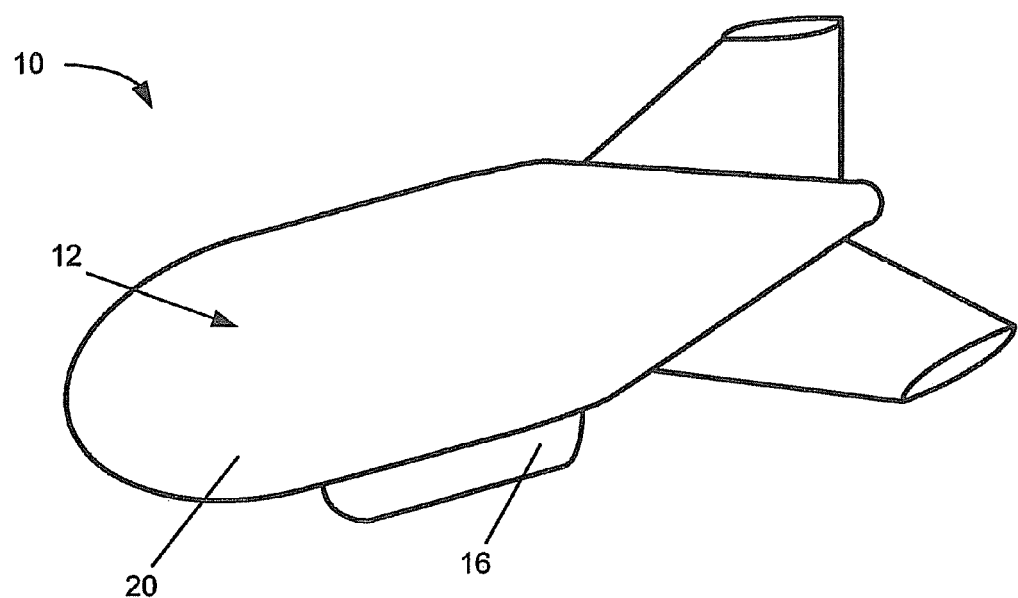
FIG. 1 is a perspective drawing of a lighter-than-air vehicle according to the present invention.

Referring now to the drawings and in particular to FIG. 1, FIG. 1 illustrates a one example of a lighter-than-air vehicle 10. Although vehicle 10 is illustrated as a lighter-than-air vehicle, it will be appreciated that the present invention is directed to a flexible laminate construction that is applicable to any lighter-than-air vehicle, platform, or other inflated structure, such as an aerostat, a blimp, an airship, a balloon, or any object that is tethered or un-tethered, and, as noted, the term "lighter-than-air or LTA" is intended to include all of these. For example, the present invention could be used in regular helium balloons, weather balloons, sails, parachutes and any application where a material needs to provide superior properties for use in withstanding the rigors of an outdoor environment and consists of panels of material that need to be joined.

The conductive seam cover tapes of the present invention can be used in any application where an impermeable or semi-impermeable seaming material/tape is needed, irrespective of the intended end-use for the tape-containing structure. These tape constructions are designed for minimum weight to allow lighter-than-air vehicle 10 to obtain maximum altitude with maximum 16. Vehicle 10 is constructed from a combination of flexible laminate hull materials, structural tapes and seam cover tapes. Several means of joining sections of hull material can be used to form vehicle 10 (e.g., stitching, heat sealing, adhesive bonding etc.), and the seam cover tapes of the present invention are used to reduce and/or eliminate gas leakage at the seam lines present in hull 12. In any instance, the seam cover tapes of the present invention are used to seal, cover, protect one or more gaps and/or seams located between one or more fabric panels or sections (e.g., hull sections). The seam cover tape constructions of the present invention are designed in such a manner to match and/or mirror the performance and/or appearance of the one or more fabric panels or sections (e.g. hull sections) that form the hull of vehicle 10. Additionally, the seam cover tape constructions have a number of desirable properties. In general, such properties include, but are not limited to, light weight, conductivity and the ability to withstand a wide range of temperature variation and daily expansion and contraction due to the temperature variations. In view of the temperature and pressure variations experienced by high altitude lighter-than-air vehicles, the seam cover tapes need to be flexible when subjected to a wide range of atmospheric and/or physical conditions.

It is also desirable that, in certain embodiments, the seam cover tapes of the present invention be ozone and ultraviolet radiation resistant and have the necessary gas permeability characteristics to allow the long duration deployment of lighter-than-air vehicles at high altitudes. It also is desirable for the seam cover tapes to have high altitude capabilities. It is believed that the constructions presented herein allow vehicle 10 to operate at altitudes of up to about 150,000 feet.

Figure 2A:
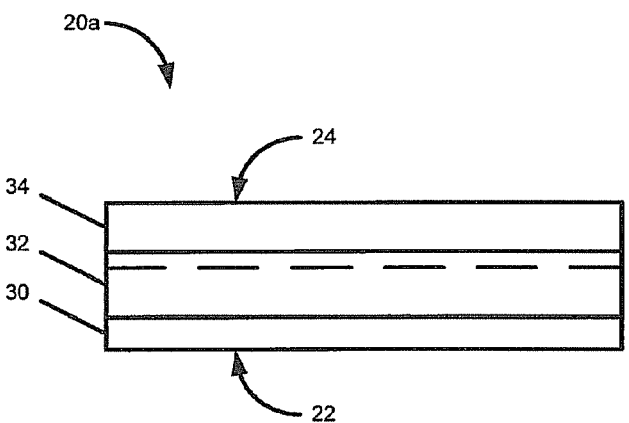
FIG. 2A is a cross-sectional drawing of a seam cover tape laminate in accordance with one embodiment of the present invention.

As seen in FIG. 2A, in one embodiment of the laminate material of the present invention is a conductive seam cover tape designated generally by reference numeral 20a. As illustrated in FIG. 2A, tape 20a has an interior surface 22 and an exterior surface 24. In this embodiment, tape 20a is formed from layers which permit/allow tape 20a to seal, cover and/or protect the gap between, for example, adjacent hull sections/panels on a lighter-than-air vehicle. In one instance, tape 20a acts as a barrier that covers and/or seals the seam lines formed by adjacent hull panels on a lighter-than-air vehicle, thereby preventing some and/or all of the leakage of gas out of a lighter-than-air vehicle. In the embodiment of FIG. 2A, tape 20a comprises at least one electrically conductive adhesive layer 30, at least one highly reflective metal-coated polyimide layer 32, which functions as a gas barrier, and at least one polyvinylidene fluoride (PVDF) layer 34, which protects the metal coating from damage and is resistant to zone and UV-light. The highly reflective metal coating provides passive thermal management by reflecting most of the incident solar radiation, reduces the helium permeation of the polyimide gas barrier layer and protects the polyimide from degradation by ozone and UV-light. Useful metal coatings for passive thermal management include but are not limited to aluminum, silver, copper, gold and platinum and their alloys or particles coated with these metals or their alloys.

Specifically, with regard to the electrically conductive adhesive layer 30, this layer can, in one embodiment, contain one or more types of conductive materials. Such materials include, but are not limited to, conductive fibers, conductive webs, conductive particles, or combinations of two or more thereof. It should be noted that the conductive materials of the present invention are not limited to any one type of materials. Suitable conductive materials include, but are not limited to, metallic powders, particulates, wires and whiskers, electrically conductive forms of carbon black, carbon nanotubes, carbon nanofibers, fullerenes (e.g., Buckyballs), or combinations of two or more thereof. Useful metals include, but are not limited to aluminum, silver, nickel, copper, platinum, gold, and their alloys, or particles coated with these metals or their alloys.

Figure 2B:
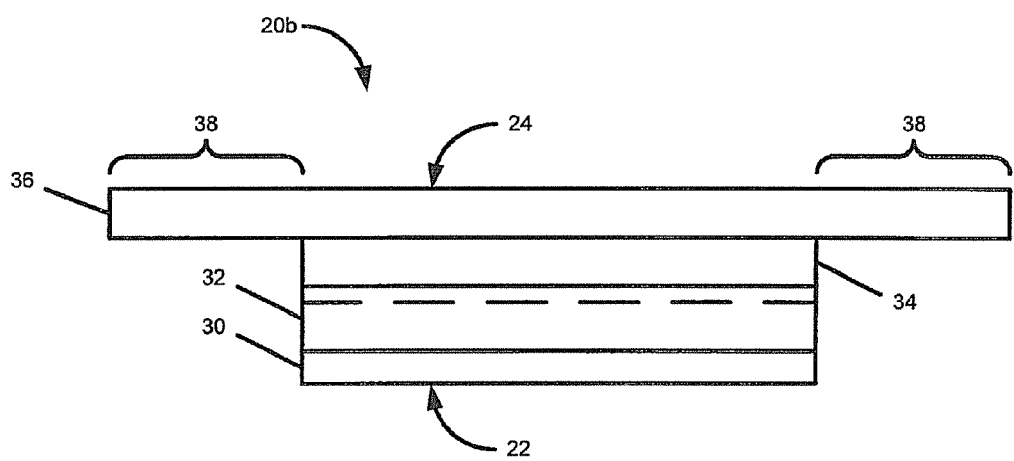
FIG. 2B is a cross-sectional drawing of a seam cover laminate in accordance with another embodiment of the present invention.

In another embodiment, at least one additional PVDF layer 36 may be provided on the exterior surface of a seam cover tape in accordance with the present invention. Such a tape is illustrated in FIG. 2B. As illustrated in FIG. 2B, tape 20b comprises at least one electrically conductive adhesive layer 30, at least one highly reflective metal-coated polyimide layer 32, which functions as a gas barrier, at least one first polyvinylidene fluoride (PVDF) layer 34, which can protects the metal coating from damage and is resistant to ozone and UV-light, at least one second PVDF layer 36, which acts as a means to heat seal or fuse the seam cover tape 20b to the exterior surface of vehicle 10.

Accordingly, tape 20b also acts as a barrier that covers and/or seals the seam lines formed by adjacent hull panels on a lighter-than-air vehicle, thereby preventing some and/or all of the leakage of gas out of a lighter-than-air vehicle. In the embodiments of FIG. 2B the at least one second PVDF layer 36 is clear, or nearly clear. In the instances where the at least one PVDF layer 36 is present, this additional PVDF layer or layers act to ensure that tape 20b remains in place on the hull sections of vehicle 10 during all operating conditions.

The layer or layers 36 can be provided with "wings" or lateral extensions 38 which give tape 20b additional width and allow for a more intimate seal between tape 20b and the hull sections/panels to which tape 20b is attached. There is no criticality in the size of wings 38. In one embodiment, wings 38 just need to provide enough overlap with the hull sections to which tape 20 joins and/or seals to provide good contact and/or sealing between adjacent hull sections. For example, in one embodiment, a conductive seam cover tape according to the present invention is about 1 to about 4 inches and has wings 38 of about 0.25 inch on each side of the tape. Furthermore, the thicknesses of layers 30, 32, 34 and/or 36 are not critical. Since tape 20 will be used on a lighter-than-air vehicle, it is important that the least amount of material necessary be employed in tape 20 in order to minimize the weight added by tape 20 to, for example, vehicle 10. For example, a 0.3 to 1.0 polyimide layer with a highly reflective metal coating can be joined to a 0.2 to 0.6 mil PVDF layer, and these layers joined to a 1.0 to 2.0 mil clear outer PVDF layer. The inner layer 22 is a coating of electrically conductive adhesive which can be about 1.3 to 4.0 mil thick. The resistance of the electrical adhesive is not critical and can be 25 to 5000 ohms across the width of the adhesive, which is sufficient to ensure normalization or equalization of electrical charge distribution across the full surface area of a lighter-than-air vehicle operating at high altitudes.

During a seaming operation, two or more hull sections or panels are joined end to end, side to side, or in any other desirable arrangement via a suitable structural seaming tape as is known in the art. There may be a need for a seam cover tape to cover, protect and/or seal seams or gaps in the hull of a light-than-air vehicle. Additionally, there may be a need for such a seam cover tape to be conductive. Accordingly, in such instances conductive seam cover tape 20a and/or 20b is placed over any seam and/or gap that may exist in the external surface of the hull 12 of vehicle 10. Through the use of heat and/or pressure, tape 20a and/or 20b will adhere to the seams and/or gaps created by two or more adjoining hull sections and/or panels. In another embodiment, tape 20a and/or 20b not only adheres to the seams and/or gaps created by two or more adjoining hull sections and/or panels but conductive adhesive 30 comes into electrical contact with the highly reflective metal-coated polyimide barrier layer f the hull 12 of vehicle 10. The conductive nature of the adhesive will mean that the adjacent panels are joined via the adhesive composition and a continuous path will be provided for conductivity.

Figure 3:
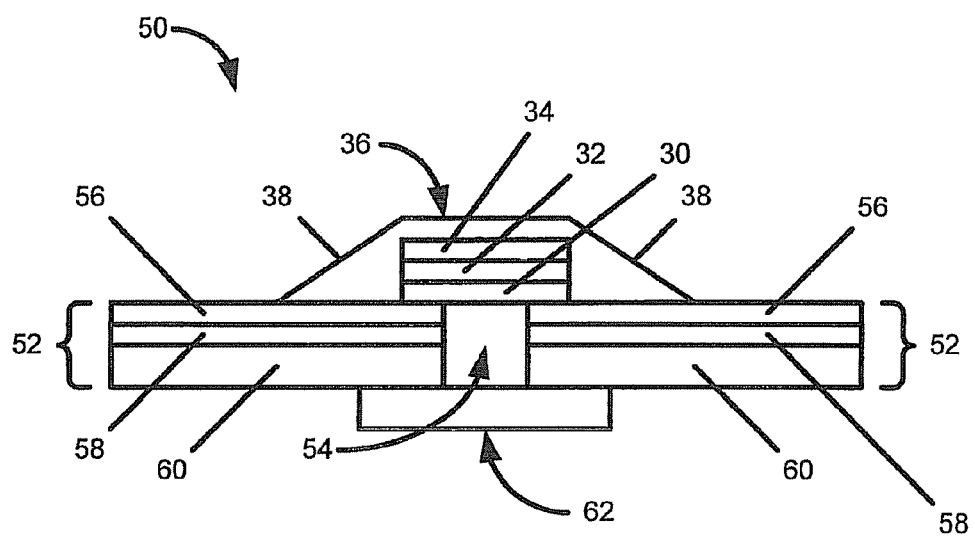
FIG. 3 is a cross-sectional view of a seam in a lighter-than-air vehicle, where fabric panels or sections are joined by a seaming tape on the interior surface of the panels and sealed/protected by a seam cover tape laminate according to one embodiment of the present invention.

Turning to FIG. 3, FIG. 3 illustrates one type of seam and/or gap 50 that is joined and/or sealed by the tape of the present invention. As seen in FIG. 3 two hull sections and/or panels 52 are illustrated as having three layers, although the present invention is not limited to just three layer hull sections and/or panels. As seen in FIG. 3 panels 52 each comprise a PVDF outer layer 56, a highly reflective metal-coated polyimide layer 58, and an inner, reinforcing cloth layer 60. Between panels 52 is a gap 54. It should be noted that although the embodiment of FIG. 3 is shown with a gap 54, such a gap need not exist. In some embodiments, panels 52 could be placed in contact with one another in order to eliminate gap 52 so as to reduce the amount of gas leakage that might occur from the seam formed from panels 52 prior to the placement of a seam cover tape 20a or 20b in accordance with the present invention.

Initially, panels 52 are joined together as is discussed above by structural seam tape 62. Then, as is shown in FIG. 3, seam cover tape 20a or 20b (see FIGS. 2A and 2B) is placed over gap 54 formed by the adjacent panels 52 with the at least one adhesive layer 30 acting to hold tape 20 in place over gap 54. When heat and/or pressure is applied to tape 20 some of the electrically conductive adhesive composition of layer 30 will flow into or penetrate PVDF layer 56 and contact the highly reflective metal-coated polyimide layer 58 of panels 52, thereby forming an electrical connection between panels 52 (not shown). Additionally, if present, PVDF wings 38 will fuse into the top PVDF layers 56 of panels 52 thereby facilitating a better seal between adjacent hull sections and/or panels and prevent separation or delamination of adhesive layer 30 from PVDF layer 56.

The adhesive component of adhesive layer 30 can itself be non-conductive. In this embodiment, adhesive layer 30 contains one or more types of conductive materials, as is detailed above. Upon the application of heat and/or pressure the one or more types of conductive material can flow through, become embedded, and/or pierce PVDF layer 56 of panels 52 to such an extent that the one or more types of conductive materials come into contact with the highly reflective metal-coated polyimide layer 58 thereby completing a conductive circuit across gap 54 (not shown).

In one of the embodiments, the highly reflective metal-coated conductive polyimide layer 32 is formed from KAPTON® or equivalent material with a coating of vacuum deposited aluminum or silver. In this embodiment, polyimide layer 32 is an excellent gas barrier material that contains and/or holds in the lighter-than-air material (e.g., helium and hydrogen) that is located within the hull of a lighter-than-air vehicle. Unfortunately, the polyimide materials suitable for use in the present invention tend to break down easily in the presence of ultraviolet light.

The metal coating on polyimide layer 32 shields and protects the polyimide later from ultraviolet radiation and reduces helium permeation. A polyvinylidene fluoride (PVDF) layer 34 is placed on top of, joined, or laminated to layer 32. PVDF layer 34 protects the metal coating from damage and provides excellent ultraviolet and ozone protection. PVDF layer 34 also enhances thermal control of the vehicle.

The layers of tape 20a and/or 20b can be bonded directly to one another, or can be bonded to each other via one or more intervening adhesive layers (not shown). In one embodiment, one or more polyurethane based adhesive layers are used to join and/or bond the layers of tape 20a and/or 20b. In the instance where one or more polyurethane based adhesive layers are used to join and/or bond the layers of tape 20a and/pr 20b, the present invention is not limited to any one polyurethane. Rather, any polyurethane composition can be used so long as the polyurethane compositions utilized in such an embodiment retains flexibility at low temperatures (e.g., at temperatures of less than −80° C.). Additionally, the polyurethane material that is used to form the adhesive polyurethane layers discussed above can also be hydrophobic.

That is, the polyurethane material is designed to repel water so as to preclude the absorption of any moisture into tape 20 that may penetrate the surface layer or layers of tape 20a and/or 20b. Furthermore, the polyurethane adhesives can also be selected so as to withstand the temperatures that vehicle 10 is subjected to at altitude during daytime operations. The adhesive material can also bond the one or more layers of tape 20a and/or 20b to one another and fills in any pin holes or gaps that may exist in such layers.

Tape 20a and/or 20b can be coated with a pressure sensitive adhesive material containing particulate material which imparts conductivity. In one embodiment, such an adhesive material is a silicone-based adhesive. A suitable electrically conductive silicone-based adhesive composition for use in the present invention comprises, in one embodiment, one or more siloxane-based adhesives (e.g., an alkenyl siloxane), one or more silicon-based adhesives, or one or more acrylic silicone adhesives, where the adhesive contains at least one electrically and/or thermally conductive filler. Furthermore, a suitable electrically conductive silicone-based adhesive composition for use in the present invention can optionally further comprise at least one thermally conductive filler or material, at least one adhesion promoter that does not deactivate a hydrosilylation catalyst, at least one hydrosilylation catalyst and at least one hydrosilylation catalyst inhibitor.

As is discussed above, electrically conductive fillers or materials can be conductive fibers, conductive webs, conductive particles, or combinations of two or more thereof. Such materials include, without limitation, metallic powders, particulates, wires and whiskers, electrically conductive forms of carbon black, carbon nanotubes, carbon nanofibers, fullerenes (e.g., Buckyballs), or combinations of two or more thereof. Useful metals include, but are not limited to aluminum, silver, nickel, copper, platinum, gold, and their alloys, or particles coated with these metals or their alloys.

Particle sizes as small as 50 to 100 μm yield good results but may not sufficiently penetrate the PVDF layer 56 on panels 52 to allow contact with the metal coated polyimide layer 58. Greater particle size approaching the thickness of PVDF layer 56 are required to ensure electrical conductivity across the seam gap 54 between panels 56. Electrically conductive fibers or metal coated fibers spheres and, particles with irregular geometries will provide the best electrical conductivity through PVDF layer 56. Examples of such materials includes but is not limited to carbon fibers, metal coated carbon fibers and glass fibers, and metal coated micro spheres and powders. The amount of the electrically conductive filler present in the adhesive formulation ranges from about 10 to about 30 weight percent.

The present invention can utilize one or more adhesion promoters. Suitable adhesion promoters for use in the present invention include, but are not limited to, aminoalkyl silanes, methacryloxy silanes, acryloxy silanes, isocyanurates, allyl isocyanurates, fumarates, succinates, maleates, alkoxy silanes, epoxy silanes, allylic alcohols, metal alkoxides, mercaptoalkyl silanes, allyl glycidyl ethers, silyl phosphates, bis (3-trimethoxysilylpropyl) fumarate and combinations of two or more thereof. In the instance where an adhesion promoter is used in conjunction with the present invention, such an adhesion promoter should be chosen so as not to deactivate any hydrosilylation catalyst employed in the present invention. If present, the amount of the adhesion promoter present in the formulations of the present invention ranges from about 0.001 to about 5 weight percent.

The adhesive compositions of the present invention will provide the means for electrical conductivity between the components being joined, connected and/or seamed by the conductive seam cover tapes of the present invention. For the adhesive system, materials having tackiness at or around room temperature, i.e., pressure-sensitive adhesives, and thermoplastic materials which manifest their adhesion upon heating, i.e., heat sensitive adhesives, are exemplary. Such materials which are capable of heat curing are similarly usable in the invention.

Multilayer films/tapes in accordance with the present invention can be formed by any suitable technique, such as extrusion coating, extrusion laminating or other laminating processes, co-extrusion and thermal or adhesive bonding of separate film layers. Single layer films prepared by various methods, such as the calender method, extrusion and casting, also can be laminated to other films with adhesives or by application of heat and pressure or they can be coated to form multilayer films.

Although the invention has been described in detail with particular reference to certain embodiments detailed herein, other embodiments can achieve the same results. Variations and modifications of the present invention will be obvious to those skilled in the art, and the present invention is intended to cover in the appended claims all such modifications and equivalents.

What is claimed is:

1. A seaming tape comprising:
   a tape having three layers;
   a first layer, the first layer being formed from at least one adhesive composition and where the first layer has an upper surface and a lower surface;
   a second layer, the second layer being formed from at least one polymer composition that possesses gas barrier properties, where the second layer has an upper surface and a lower surface and the lower surface of the second layer is oriented toward and in contact with the upper surface of the first layer; and
   a third layer, the third layer being formed from one or more UV-resistant polymer compositions, where the third layer has an upper surface and a lower surface and the lower surface of the third layer is oriented toward and in contact with the upper surface of the second layer,
   where at least one of the first, second and third layers is electrically conductive, and at least one of the first, second and third layers is electrically non-conductive.

2. The tape of claim 1, wherein the first layer is formed from at least one silicone-based adhesive.

3. The tape of claim 1, wherein the second layer is formed from at least one polyimide composition.

4. The tape of claim 1, wherein the third layer is formed from one or more polyvinylidene fluorides.

5. The first layer of claim 2, wherein the adhesive is electrically conductive.

6. The second layer of claim 3, wherein the polyimide contains a reflective metal coating.

7. The tape of claim 1, wherein the tape is adapted for use as a seam cover tape for sealing and protecting the seam gap between adjacent hull sections of a lighter-than-air vehicle.

8. The tape of claim 1, wherein the tape is adapted for making local repairs to the protective coatings on fabric panels or sections that are used to form lighter-than-air vehicles.

9. A seaming tape for sealing and/or reinforcing the seams in a hull of a lighter-than-air vehicle where the tape comprises:
   a tape having four layers;
   a first layer, the first layer being formed from at least one adhesive composition and where the first layer has an upper surface and a lower surface;

a second layer, the second layer being formed from at least one polymer composition that possesses gas barrier properties, where the second layer has an upper surface and a lower surface and the lower surface of the second layer is oriented toward and in contact with the upper surface of the first layer; and a third layer, the third layer being formed from one or more UV-resistant polymer compositions, where the third layer has an upper surface and a lower surface and the lower surface of the third layer is oriented toward and in contact with the upper surface of the second layer; and a fourth layer, the fourth layer being formed from one or more clear UV-resistant polymer compositions, where the fourth layer has an upper surface and a lower surface and the lower surface of the fourth layer is oriented toward and in contact with the upper surface of the third layer, where at least one of the first, second and third layers is electrically conductive, and at least one of the first, second and third layers is electrically non-conductive.

10. The tape of claim 9, wherein the first layer is formed from at least one silicone-based adhesive.

11. The tape of claim 9, wherein the second layer is formed from at least one polyimide composition.

12. The tape of claim 9, wherein the third layer is formed from one or more polyvinylidene fluorides.

13. The tape of claim 9, wherein the fourth layer is formed from one or more clear polyvinylidene fluorides.

14. The first layer of claim 10, wherein the adhesive is electrically conductive.

15. The second layer of claim 11, wherein the polyimide contains a reflective metal coating.

16. The tape of claim 13, wherein the fourth layer has a portion that extends beyond the first, second and third layers.

17. The tape of claim 16, wherein the fourth layer can be fused into the top layer of fabric panels or sections that are used to form lighter-than-air vehicles.

18. The tape of claim 9, wherein the tape is adapted for use as a seam cover tape for sealing and protecting the seam gap between adjacent hull sections of a lighter-than-air vehicle.

19. The tape of claim 9, wherein the tape is adapted for making local repairs to the protective coatings on fabric panels or sections that are used to form lighter-than-air vehicles.

* * * * *